US007285064B2

(12) United States Patent
Ichida et al.

(10) Patent No.: US 7,285,064 B2
(45) Date of Patent: Oct. 23, 2007

(54) BICYCLE GEAR SHIFTING CONTROL APPARATUS

(75) Inventors: Tadashi Ichida, Ikoma (JP); Kazuhiro Fujii, Kawachinagano (JP); Ryuichiro Takamoto, Sakai (JP); Masahiko Jimbo, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 11/177,472

(22) Filed: Jul. 11, 2005

(65) Prior Publication Data

US 2006/0189423 A1    Aug. 24, 2006

(30) Foreign Application Priority Data

Feb. 18, 2005  (JP)  ............................. 2005-042899

(51) Int. Cl.
  *B62M 9/12*   (2006.01)
  *B62M 25/04*  (2006.01)
  *F16H 59/04*  (2006.01)

(52) U.S. Cl. ...................................................... 474/80
(58) Field of Classification Search ............ 474/78–82; 74/502.2, 502.6, 506
  See application file for complete search history.

(56) References Cited

U.S. PATENT DOCUMENTS

| | | | |
|---|---|---|---|
| 5,357,177 A |  | 10/1994 | Fey et al. |
| 6,389,925 B1 | * | 5/2002 | Ose ........................ 74/502.2 |
| 6,629,903 B1 | * | 10/2003 | Kondo ........................ 474/82 |
| 6,634,253 B2 | * | 10/2003 | Gioia ........................ 474/80 |
| 6,644,143 B2 | * | 11/2003 | Feng et al. ................ 74/502.2 |
| 6,679,797 B2 |  | 1/2004 | Valle |
| 6,740,003 B2 |  | 5/2004 | Fukuda |
| 6,810,764 B2 | * | 11/2004 | Chen ........................ 74/502.2 |
| 6,834,876 B2 |  | 12/2004 | Fukuda |
| 6,837,505 B2 | * | 1/2005 | Fujii ........................... 280/260 |
| 6,857,975 B2 | * | 2/2005 | Kitamura .................... 474/70 |
| 6,866,279 B2 | * | 3/2005 | Fujii ........................... 474/69 |
| 2003/0177855 A1 | * | 9/2003 | Tsumiyama et al. ...... 74/502.2 |
| 2004/0017286 A1 | * | 1/2004 | Takeda ....................... 340/432 |

FOREIGN PATENT DOCUMENTS

EP    0566024 A1    10/1993

(Continued)

OTHER PUBLICATIONS

U.S. Appl. No. 10/906,469, Shimano Inc.

(Continued)

*Primary Examiner*—Marcus Charles
(74) *Attorney, Agent, or Firm*—Global IP Counselors, LLP (57) ABSTRACT

A bicycle gear shifting control apparatus has a manually operated shift device, a first gear shifting operation executing component, and a second gear shifting operation executing component. The manually operated shift device operates a front derailleur to shift gears. In response to operation of the manually operated shift device, the first gear shifting operation executing component executes a first gear shifting operation to move the front derailleur from a first shift position of a first sprocket to a second shift position of second sprocket. The second gear shifting operation executing component executes a second gear shifting operation to move the front derailleur a very small amount from the second shift position to a post shift position upon determining that the shifting operation should proceed.

18 Claims, 8 Drawing Sheets

FOREIGN PATENT DOCUMENTS

| | | | |
|---|---|---|---|
| EP | 0647558 A1 * | 4/1995 | |
| EP | 0906864 A2 * | 4/1999 | |
| EP | 1238903 A2 * | 9/2002 | |
| EP | 1338505 A2 | 8/2003 | |
| EP | 1359088 A2 | 11/2003 | |
| EP | 1359088 A2 * | 11/2003 | |
| JP | 05-254482 A * | 10/1993 | |
| JP | 2002-087371 A | 3/2002 | |
| JP | 2003-320987 A | 11/2003 | |

OTHER PUBLICATIONS

U.S. Appl. No. 10/907,544, Shimano Inc.

* cited by examiner

BICYCLE GEAR SHIFTING CONTROL APPARATUS

CROSS-REFERENCE TO RELATED APPLICATIONS

This application claims priority under 35 U.S.C. § 119 to Japanese Patent Application No. 2005-042899. The entire disclosure of Japanese Patent Application No. 2005-042899 is hereby incorporated herein by reference.

BACKGROUND OF THE INVENTION

1. Field of the Invention

The present invention generally relates to a bicycle gear shifting control apparatus. More specifically, the present invention relates to a bicycle gear shifting control apparatus for moving a front derailleur from a first sprocket to a second sprocket, with the front derailleur being configured such that it can be mounted to a bicycle and the sprockets being arranged along an axial direction.

2. Background Information

One known type of gear shifting device for a bicycle is an externally mounted gear shifting device having a front derailleur and a rear derailleur. This type of externally mounted gear shifting device is configured to use the front derailleur and the rear derailleur to change speeds (shift gears) by moving a chain among a plurality of front sprockets mounted to a crank shaft so as to be arranged along the axial direction of the crank shaft and a plurality of rear sprockets mounted to a rear hub shaft so as to be arranged along the axial direction of the rear hub shaft. The idea of using derailleurs that are driven using an electric motor or other actuator such that they can be controlled electrically and providing a control device to control the derailleurs is well known in the bicycle field of externally mounted gear shifting devices (see for example, Japanese Laid-Open Patent Publication No. 2002-87371).

In conventional technologies that employ an electrically controlled derailleur to accomplish gear shifting control, upshifting and downshifting are performed, for example, by manually operating a button that serves as a manually operated shift device for shifting gears.

In view of the above, it will be apparent to those skilled in the art from this disclosure that there exists a need for an improved bicycle gear shifting control apparatus. This invention addresses this need in the art as well as other needs, which will become apparent to those skilled in the art from this disclosure.

SUMMARY OF THE INVENTION

It has been discovered that when a front derailleur is used to downshift, i.e., move the chain from a larger diameter sprocket to a smaller diameter sprocket, the chain is sometimes moved farther inward toward the frame than the smaller diameter sprocket and the chain falls off the sprocket (i.e., the chain "falls off"). When the chain falls off, it sometimes becomes jammed between the frame and the sprocket, resulting in such problems as a broken chain. With the conventional technologies described above, there is the possibility that the chain will be moved with excess force during downshifting and the chain will fall off.

Since the chain is moved by the front derailleur and the rear derailleur in response to manual operation of a manually operated shift device, there are situations in which the combination of front and rear sprockets on which the chain is placed results in the chain being arranged in a crosswise orientation (i.e., oriented diagonally with respect to the longitudinal direction of the bicycle frame in a top plan view). A crosswise chain orientation can occur when the chain is placed on an outer sprocket in the front and an inner sprocket in the rear or when the chain is placed on an inner sprocket in the front and an outer sprocket in the rear ("inner" meaning closer to the frame and "outer" meaning farther from the frame along the axial direction of the crank shaft or the hub shaft). When such a sprocket combination is used, the chain sometimes contacts (drags on) the chain guide of the front derailleur.

Regarding a bicycle provided with a gear shifting control apparatus configured to move a front derailleur in response to manual operation of a manually operated shift device, one object of the present invention is to make it more difficult for the chain to fall off when the front derailleur is moved in response to the manual operation of the manually operated shift device.

Another object of the present invention is to prevent the chain from contacting (dragging on) the front derailleur after the front derailleur has been moved in response to the manual operation of the manually operated shift device.

The foregoing objects can basically be attained by providing a bicycle gear shifting control apparatus in accordance with a first aspect of the present invention. The bicycle gear shifting control apparatus in accordance with a first aspect of the present invention basically includes a front derailleur, a manually operated shift device, a first gear shifting component and a second gear shifting component. The front derailleur includes a movable chain guide configured to move a bicycle chain. The manually operated shift device is configured and arranged to operate the front derailleur to shift gears between at least a first sprocket and a second sprocket with the first and second sprockets being selectively an initial sprocket and a shifted sprocket depending on a shift direction. The first gear shifting component is configured to perform a first gear shifting operation to move the chain guide from an initial sprocket engaged position to a shifted sprocket engaged position in response to a manual operation of the manually operated shift device such that the bicycle chain is shifted from the initial sprocket to the shifted sprocket. The second gear shifting component is configured to perform a second subsequent gear shifting operation to move the chain guide an additional amount from the shifted sprocket engaged position to a post shift position that maintains the bicycle chain on the shifted sprocket after pausing at the shifted sprocket engaged position.

With this gear shifting control apparatus, the first gear shifting operation executing component moves the front derailleur from the first shift position (initial sprocket engaged sprocket engaged) to the second shift position (shifted sprocket engaged position) when the manually operated shift device is operated. Then, when the first gear shifting operation is completed and it is determined that it is okay to continue on to the next gear shifting operation, the second gear shifting operation executing component moves the front derailleur a very small amount from the second shift position to the post shift position. Thus, after the front derailleur is moved roughly in the first gear shifting operation, the front derailleur is moved a small amount in the second gear shift operation to such a position that the chain does not touch the front derailleur. More specifically, when the chain is on an outward sprocket the chain is moved a small distance in the inward direction, and when the chain is on an inward sprocket the chain is moved a small distance in the outward direction. Also, when the front derailleur is used to downshift by moving the chain from a larger diameter sprocket to a smaller diameter sprocket, the chain is less likely to fall off because the derailleur stops at the intermediate second shift position. Since the movement of the front derailleur is divided into a first gear shifting operation in which the front derailleur is moved from a first shift position to a second shift position and a second gear shifting operation in which the front derailleur is moved a very small amount from the second shift position to a post shift position, the chain can be prevented from touching the front derailleur by setting the direction in which and the amount by which the derailleur is moved in the second gear shifting operation appropriately in accordance with shift position of the rear derailleur. Also, since the second gear shifting operation is executed after the first gear shifting operation has been completed, the front derailleur stops temporarily at an intermediate point during the process of shifting the chain from one sprocket to the other. As a result, it is more difficult (less likely) for the chain to fall off.

A bicycle gear shifting control apparatus in accordance with a second aspect of the present invention is a device in accordance with the first aspect of the present invention, wherein the second gear shifting component is further configured to change a location of the post shift position in accordance with a detected rear derailleur gear position. With this aspect of the present invention, it is difficult for the chain to touch the front derailleur even if the chain is shifted to a sprocket combination that causes the chain to assume a crosswise orientation.

A bicycle gear shifting control apparatus in accordance with a third aspect of the present invention is a bicycle gear shifting control apparatus in accordance with the second aspect of the present invention, wherein the second gear shifting component is further configured to selectively move the chain guide to one of a first post shift location and a second post shift location as the post shift position with the second post shift location being the located farther away from the initial sprocket than the first post shift location. With this aspect of the present invention, since the post shift position includes two shift positions, the chain can be prevented from touching the front derailleur when the chain is in a crosswise orientation by moving the front derailleur to the first post shift position, which is closer to the first or initial sprocket. Meanwhile, when the orientation of the chain is not particularly crosswise (i.e., the chain is substantially parallel to the longitudinal direction of the frame), the chain can be placed onto the second sprocket in an efficient manner by moving the front derailleur to the second post shift position, which closer to the second or shifted sprocket than the first post shift position.

A bicycle gear shifting control apparatus in accordance with a fourth aspect of the present invention is a bicycle gear shifting control apparatus in accordance with the third aspect of the present invention, wherein the shifted sprocket engaged position is located between the first post shift location and the second post shift location. With this aspect of the present invention, the chain is shifted accurately in the first gear shift operation because the second shift position is located in a position comparatively close to the second sprocket. As a result, it is more difficult for the chain to fall off.

A bicycle gear shifting control apparatus in accordance with a fifth aspect of the present invention is a bicycle gear shifting control apparatus in accordance with the third aspect of the present invention, wherein the shifted sprocket engaged position is located between the initial sprocket engaged position and the first post shift location. With this aspect of the present invention, the first gear shifting operation can be completed with a small amount of movement because the second shift position (shifted sprocket engaged position) is closer to the first or initial sprocket than the first post shift location.

A bicycle gear shifting control apparatus in accordance with a sixth aspect of the present invention is a bicycle gear shifting control apparatus in accordance with anyone of the third to fifth aspects of the present invention, wherein the second gear shifting component is further configured to move the chain guide from the shifted sprocket engaged position to the first post shift location upon detecting a positional relationship between the shifted sprocket and the rear derailleur gear position that causes the bicycle chain to be laterally angled greater than a prescribed angle; and the second gear shifting component is further configured to move the chain guide from the shifted sprocket engaged position to the second post shift position upon detecting the positional relationship between the shifted sprocket and the rear derailleur gear position that causes the bicycle chain to be laterally angled less than the prescribed angle. With this aspect of the present invention, when the chain is on a rear sprocket that is positioned toward the high gear side such that the chain assumes a crosswise orientation, the front derailleur is moved to first post shift location, which is closer to the first sprocket than the second post shift location. As a result, the chain and front derailleur can be reliably prevented from touching each other. Additionally, the chain can be prevented from falling off the sprocket when it is downshifted to a smaller sprocket.

A bicycle gear shifting control apparatus in accordance with a seventh aspect of the present invention is a bicycle gear shifting control apparatus in accordance with anyone of the first to sixth aspects of the present invention, wherein a shift continuation determining component is provided to detect if the first gear shifting operation has been completed when a prescribed amount of time has elapsed. With this aspect of the present invention, the first gear shifting operation is not determined to be completed immediately after the front derailleur moves to the second shift position. Instead, a prescribed amount of time (e.g., 0.5 to 2 seconds) is allowed to elapse before the first gear shifting operation is determined to have been completed. As a result, the amount of time during which the front derailleur is temporarily stopped is longer and it is even more difficult for the chain to fall off.

A bicycle gear shifting control apparatus in accordance with an eighth aspect of the present invention is a bicycle gear shifting control apparatus in accordance with anyone of the first to sixth aspects of the present invention, wherein a shift continuation determining component is provided to detect if the first gear shifting operation has been completed based a rotational position of a bicycle crank reaching a prescribed rotational position. With this aspect of the present invention, if the rotational position where the chain drops away from the first sprocket and the rotational position where the chain becomes engaged around the second sprocket are set in advance, the end of the first gear shifting operation can be determined accurately based on the crank position.

A bicycle gear shifting control apparatus in accordance with a ninth aspect of the present invention is a bicycle gear shifting control apparatus in accordance with anyone of the first to eighth aspects of the present invention, further provided with a shift position setting component configured and arranged to selectively change the initial sprocket engaged position, the shifted sprocket engaged position and the post shift position relative to the initial sprocket and the shifted sprocket. With this aspect of the present invention, the shift operation can be accomplished more smoothly in accordance with the frame of the bicycle because the shift positions can be changed.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
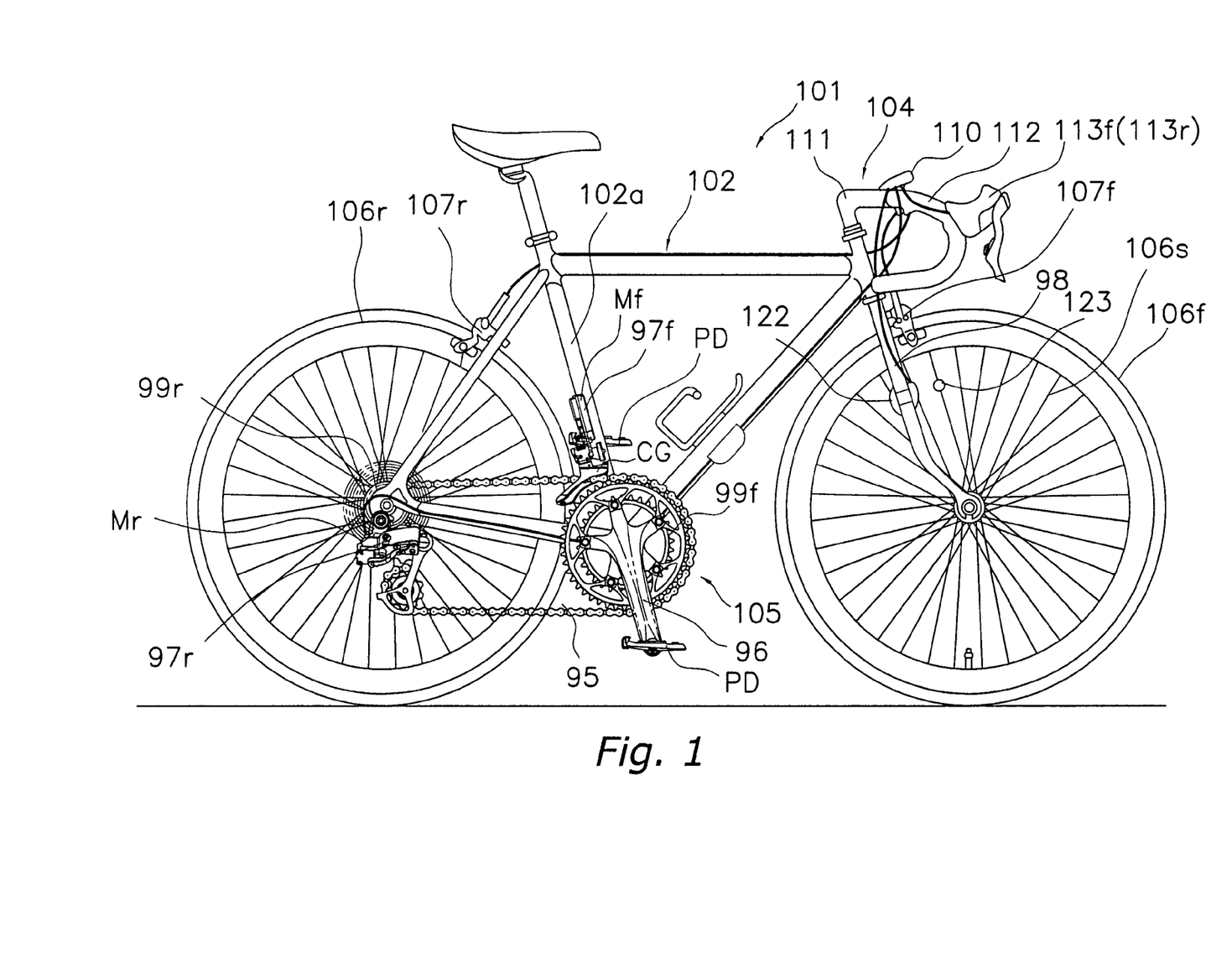
FIG. 1 is a side elevational view of a bicycle that is equipped with a bicycle gear shifting control apparatus in accordance with one embodiment of the present invention.

FIG. 1 shows a bicycle 101 in which an embodiment of the present invention is employed. The bicycle 101 is a "road racer" (racing style road bike). The bicycle 101 basically includes a diamond-shaped frame 102 having a front fork 98, a handlebar unit 104 fastened to the front fork 98, a drive unit 105, a front wheel 106f mounted to the front fork 98 and a rear wheel 106r mounted to a rear portion of the frame 102. The drive unit 105 basically includes a chain 95, a crank 96 on which pedals PD are mounted, a motorized front derailleur 97f, a motorized rear derailleur 97r, a front sprocket cluster 99f, and a rear sprocket cluster 99r. The bicycle 101 also includes a front rear brake device 107f, a rear brake device 107r, and a gear shifting control apparatus 110 configured to control the front and rear derailleurs 97f and 97r.

Figure 2:
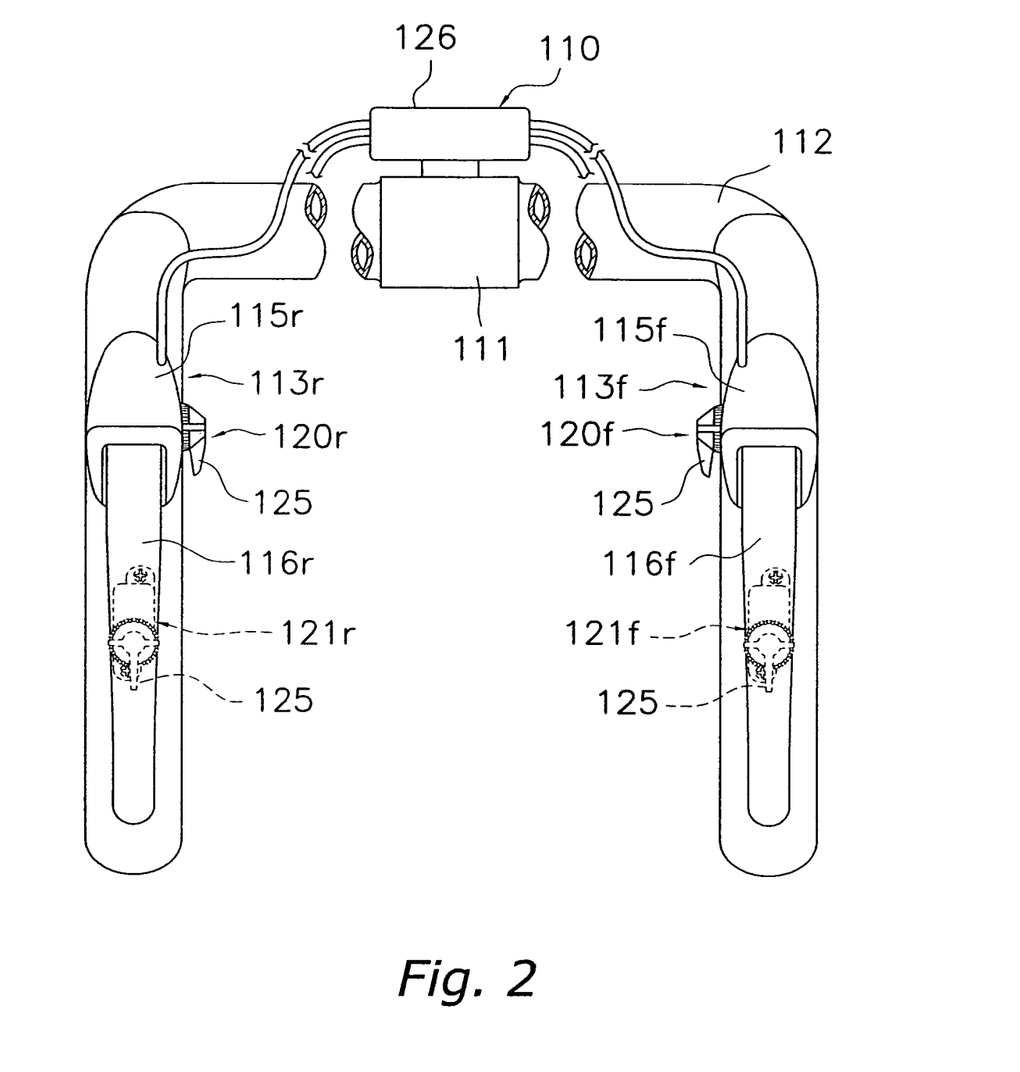
FIG. 2 is a partial front elevational view of the handlebar component of the bicycle that is equipped with the bicycle gear shifting control apparatus in accordance with the present invention.
Figure 3:
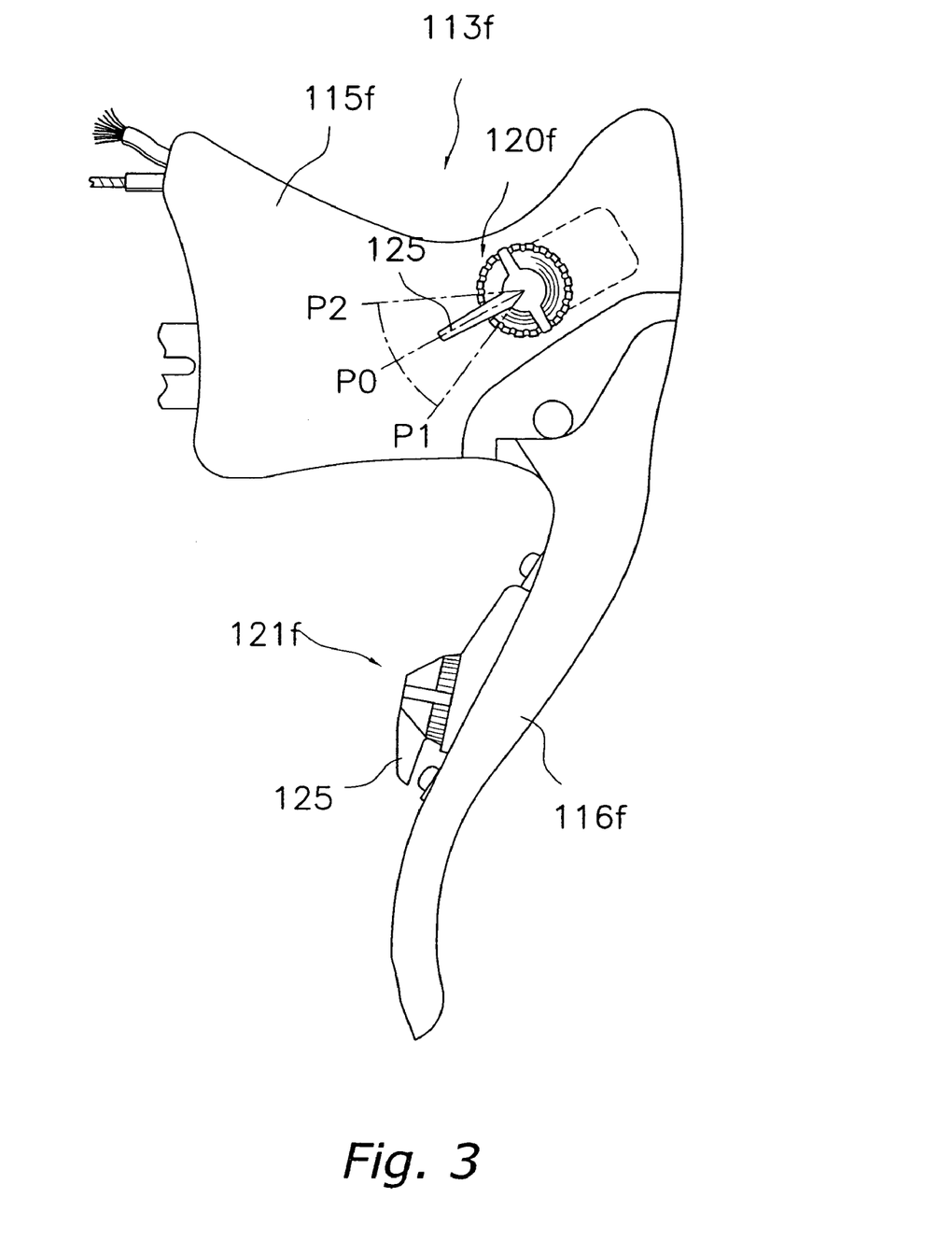
FIG. 3 is an enlarged side elevational view of a front brake control lever or brake operating device with the bicycle gear shifting control apparatus in accordance with the present invention.
Figure 4:
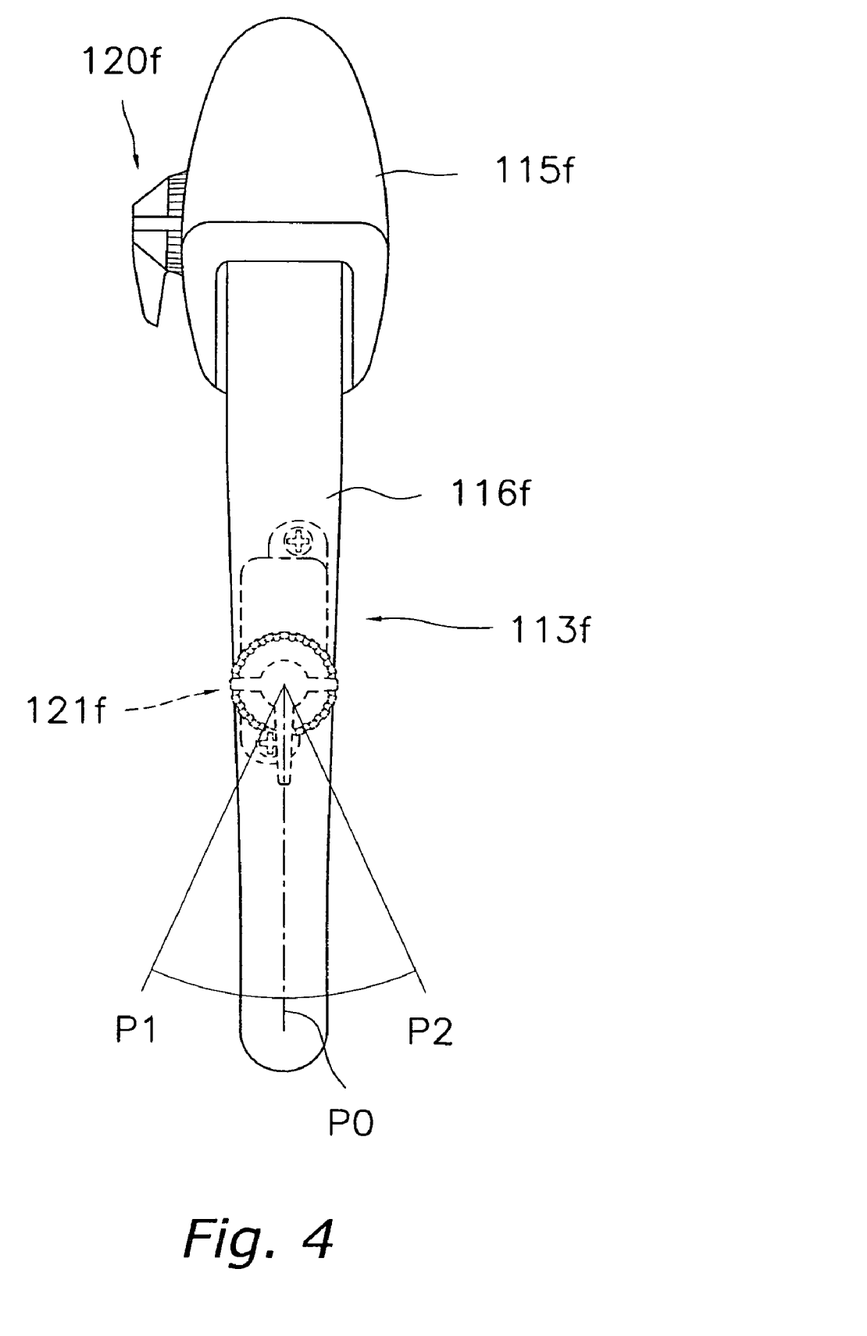
FIG. 4 is an enlarged front elevational view of the front brake control lever or brake operating device illustrated in FIG. 3 in accordance with the present invention.

The handlebar unit 104 comprises a handlebar stem 111 and a handlebar 112 fitted into and fastened to the upper end of the handlebar stem 111. The handlebar stem 111 is fitted into and fastened to the upper part of the front fork 98. The handlebar 12 is a drop-type handlebar equipped with a left-right pair of brake levers 113f and 113r. As shown in FIGS. 2 to 4, the brake levers 113f and 113r comprise front and rear brake brackets 115f and 115r that are mounted to the end sections of the handlebar 112, and front and rear lever members 116f and 116r that are mounted in a freely pivoting manner to the brake brackets 115f and 115r, respectively.

Front and rear derailleur operating devices 120f and 120r and front and rear derailleur operating devices 121f and 121r for operating the front and rear derailleurs 97f and 97r are separately provided on the inside surfaces of the brake brackets 115f and 115r and the rear surfaces of the lever members 116f and 116r. The front derailleur operating device 120f and the rear derailleur operating device 120r are provided such that the front and rear derailleurs 97f and 97r can be operated when the rider's hands are resting on the front brake bracket 115f and the rear brake bracket 115r, respectively. The front derailleur operating device 121f and the rear derailleur operating device 121r are also provided such that the front and rear derailleurs 97f and 97r can be operated when the rider's hands are resting on the front lever member 116 and the rear lever member 116r, respectively.

Figure 6:
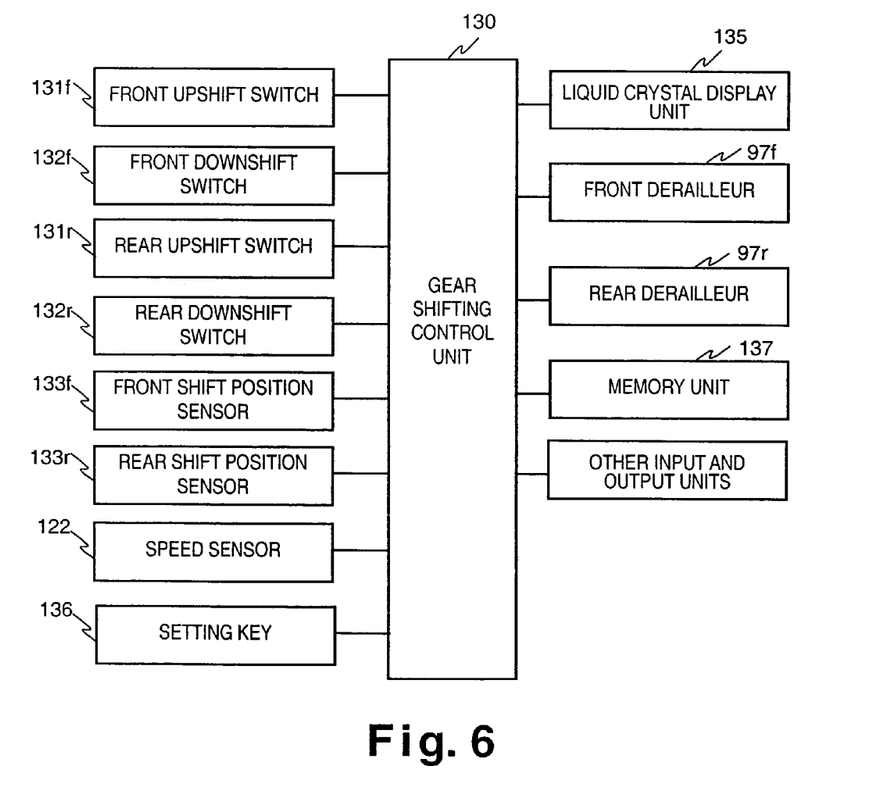
FIG. 6 is a block diagram showing the main components of the gear shifting control apparatus in accordance with the present invention.

The derailleur operating devices 120f, 120r, 121f and 121r each have a manually operated member 125 that can be pivoted freely between a central position P0, a first position P1 reached by pivoting downward or inward from the central position P0, and a second position P2 reached by pivoting upward or outward from the central position P0. The manually operated member 125 is spring loaded toward the central position P0. As shown in FIG. 6, a front upshift switch 131f and a front downshift switch 132f are provided inside each derailleur operating device 120f and 121f. Similarly, a rear upshift switch 131r and a front downshift switch 132r are provided inside each derailleur operating device 120r and 121r. In this embodiment, when one of the manually operated members 125 is moved to the first position P1, the front or rear upshift switch 131f and 131r turns on, and when one of the manually operated members 125 is moved to the second position P2, the front or rear downshift switch 132f and 132r turns on. The desired combination of front and rear gears is set as appropriate by the rider.

As described previously, the drive unit 105 includes the chain, the front and rear sprocket clusters 99f and 99r, and the front and rear derailleurs 97f and 97r that serve to shift the chain 95 from one sprocket to another. The front derailleur 97f is an electric powered (electromechanical) derailleur with an electric motor Mf that can be controlled electrically. The front derailleur 97f is mounted to the seat tube 102a of the frame 102 and serves to guide the chain 95 to and from two shift or gear positions. The rear derailleur 97r is also an electric powered derailleur with an electric motor Mr that can be controlled electrically. The rear derailleur 97r is mounted to a rear portion of the frame 102 and has ten shift or gear positions. The derailleurs 97f and 97r operate using electric power supplied from a power source that is not shown in the figures. As shown in FIG. 6, each of the derailleurs 97*f* and 97*r* is provided with a shift position sensor 133*f* and 133*r* that serves to detect the shift position of the derailleur 97*f* and 97*r*.

Figure 5:
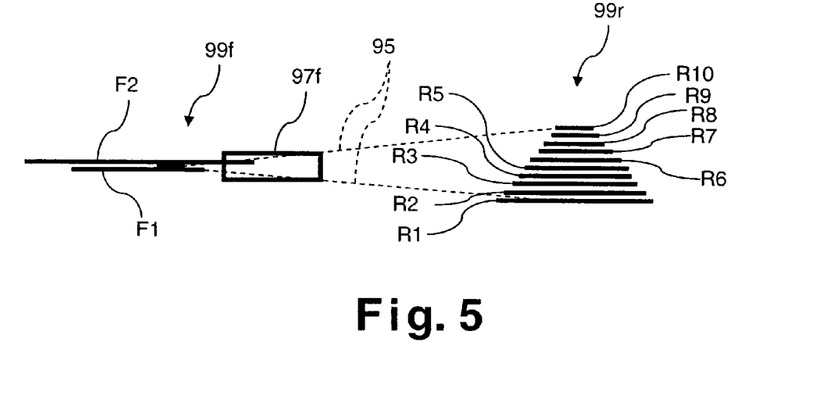
FIG. 5 is a simplified schematic view of a bicycle drive train showing the arrangement of the front and rear sprocket clusters.

As shown in FIG. 5, the front sprocket cluster 99*f* has two sprockets F1 and F2 that are arranged (separated from each other) along the axial direction of the crank shaft and have different tooth counts. Similarly, the rear sprocket cluster 99*r* has ten sprockets R1 to R10 that are arranged (separated from each other) along the axial direction of the rear wheel hub shaft (axle) and have different tooth counts. The inner front sprocket F1 has a smaller tooth count than the outer front sprocket F2, i.e., the front sprocket F2 is the higher-gear sprocket. The tooth counts of the rear sprockets decrease successively from the innermost sprocket R1 to the outermost sprocket R10, the outermost sprocket R10 having the smallest tooth count and being the highest gear sprocket. The front and rear derailleurs 97*f* and 97*r* are configured to execute shift operations to move the chain 95 to any of the front sprockets F1 and F2 and the rear sprockets R1 to R10. The rider initiates these shift operations by operating the derailleur operating devices 120*f*, 120*r*, 121*f* and 121*r*.

As shown in FIGS. 2 to 6, the gear shifting control apparatus 110 includes, for example, a case member 126 mounted to a middle portion of the handlebar 112 containing a gear shifting control unit 130 and the aforementioned derailleur operating devices 120*f*, 120*r*, 121*f* and 121*r*. The gear shifting control unit 130 is programmed to constitute first and second gear shifting operation executing components.

In particular, the gear shifting control unit 130 preferably includes a microcomputer stored inside the case member 126 with the microcomputer including a gear shifting control program that controls the motors Mf and Mr of the derailleurs 97*f* and 97*r* in response to the operation of the derailleur operating devices 120*f*, 120*r*, 121*f* and 121*r*, as discussed below. In other words, the microcomputer of the gear shifting control unit 130 is programmed to execute the processing illustrated in FIG. 7, as discussed below. The gear shifting control apparatus 110 also has a liquid crystal display unit 135 housed in the case member 126. The gear shifting control unit 130 can also include other conventional components such as an input interface circuit, an output interface circuit, and storage devices such as a ROM (Read Only Memory) device and a RAM (Random Access Memory) device. It will be apparent to those skilled in the art from this disclosure that the precise structure and algorithms for the gear shifting control unit 130 can be any combination of hardware and software that will carry out the functions of the present invention.

The derailleur operating devices 120*f*, 120*r*, 121*f*, and 121*r* are examples of the manually operated shift devices. The gear shifting control unit 130 is connected to the front and rear upshift switches 131*f* and 131*r* and the front and rear downshift switches 132*f* and 132*r* of the derailleur operating devices 120*f*, 120*r*, 121*f*, and 121*r*, a setting key 136 for performing various settings, a speed sensor 122 mounted to the front fork 98, the front and rear derailleurs 97*f* and 97*r*, a memory unit 137 for storing the value of each shift position, and other input and output devices. The speed sensor 122 is configured and arranged to detect the rotation of the front wheel 106*f* by detecting a magnet 123 mounted to a spoke 106*s* of the front wheel 106f. The speed sensor 122 sends a rotational speed signal to the gear shifting control unit 130 using either a wire or a wireless transmission device. The setting key 136 is arranged in the case member 126 along side the liquid crystal display device 135.

The gear shifting control unit 130 controls the shifting (movement to different shift positions) of the front and rear derailleurs 97*f* and 97*r* based on the signals it receives from the front and rear upshift switches 131*f* and 131*r*, the front and rear downshift switches 132*f* and 132*r*, and the front and rear shift position sensors 133*f* and 133*r*. The gear shifting control unit 130 also displays the speed of the bicycle, the shift positions, and the distance travelled on the liquid crystal display unit 135 based on the signals from the speed sensor 122 and the shift position sensors 133*f* and 133*r*. The setting key 136 is used to change each of the shift positions assumed by the front derailleur 97*f* when the front derailleur 97*f* is upshifted and downshifted.

Figure 8:
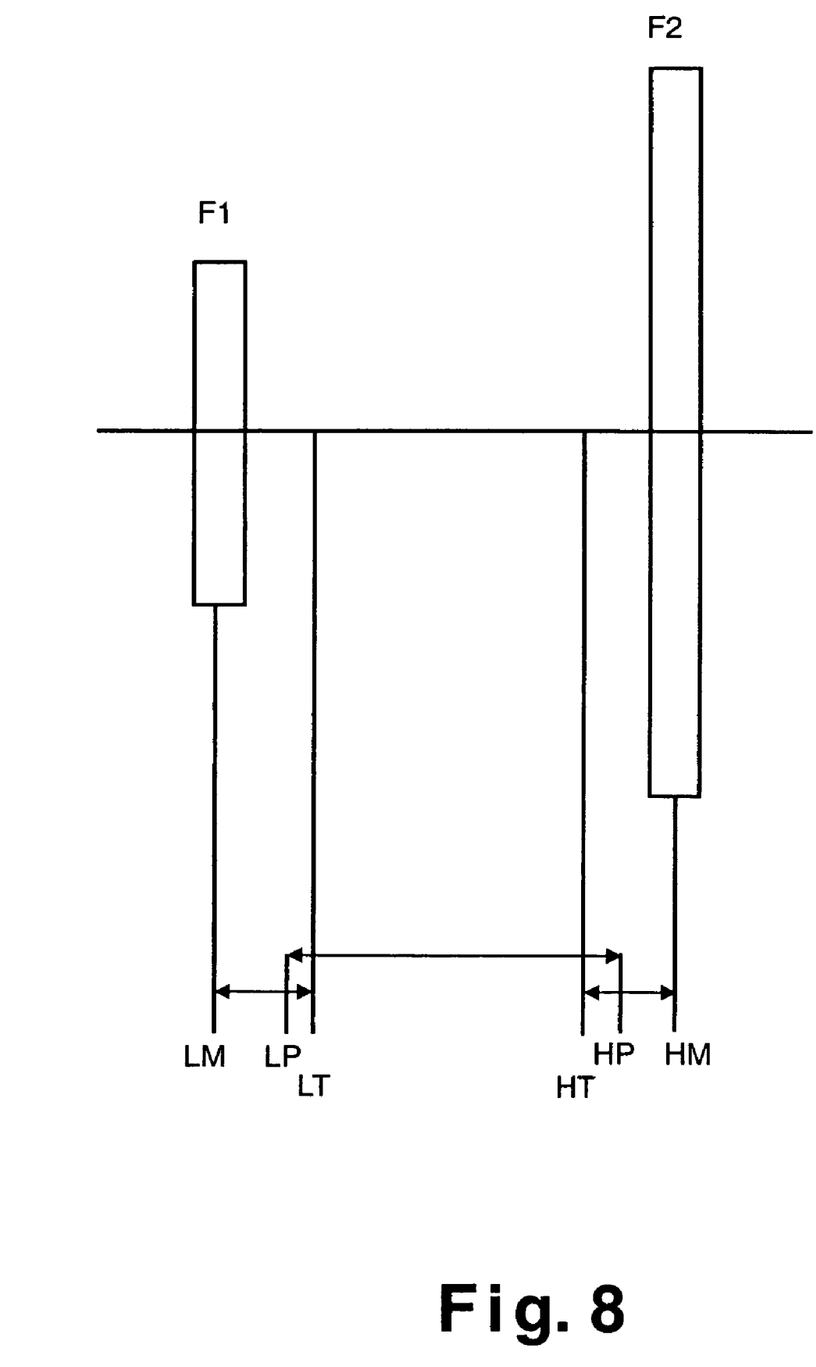
FIG. 8 is a simplified schematic view of a first front sprocket cluster that shows the positional relationships of the shift positions in accordance with one application of the present invention.

The control method of the gear shifting control unit 130 and the general operation of the apparatus will now be explained with reference to FIG. 8. With this gear shifting control unit 130, when the front derailleur 97*f* moves from the larger diameter high-gear sprocket F2 (the first or initial sprocket) to the smaller diameter low-gear sprocket F1 (the second or shifted sprocket), the front derailleur 97*f* moves from an initial sprocket engaged position (first shift position) HM or HT to a shifted sprocket engaged position (second shift position) LP in response to a manual operation of the manually operated shift device. The first shift position HM or HT corresponds to the first sprocket F2, while the shifted sprocket engaged position (second shift position) LP corresponds to the second sprocket F1 during a downshift. Whether the initial sprocket engaged position (first shift position) is in the shift position HM or the shift position HT depends upon the angle of the chain 95 formed between the front sprocket F2 and the rear gears R1 to R10 relative to a plane that is perpendicular to the axes of rotation of the front sprockets F1 and F2 and the rear gears R1 to R10, as explained below. From the shifted sprocket engaged position (second shift position) LP, the chain guide CG moves a very small amount to a post shift position (third shift position) LM or LT. The shift position LP is a location where the chain 95 can be placed on the front sprocket F1, while the shift position LM and LT are locations where the chain 95 can be maintained on the front sprocket F1. Thus, the post shift position, during a downshift operation, includes a first post downshift location LT and a second post downshift location LM with the second post downshift location LM being farther from the sprocket F2 than the first post downshift location LT. The first post downshift location LT is a trimming shift position for preventing the chain 95 from touching the chain guide CG (which is depicted as a rectangle in FIG. 5) of the front derailleur 97*f* when the combination of shift positions of the derailleurs 97*f* and 97*r* is such that the chain 95 assumes a crosswise orientation. More specifically, when the front derailleur 97*f* is positioned at the low-gear sprocket F1 and the rear derailleur 97*r* is positioned at one of the highest three sprockets R8 to R10, the chain 95 assumes a crosswise orientation as indicated with the dotted lines in FIG. 5. Thus, the first post downshift location LT is selected when the control unit 130 detects a positional relationship between the low-gear (shifted) sprocket F1 and the rear derailleur gear position that causes the bicycle chain 95 to be laterally angled greater than a prescribed angle, e.g., when the rear derailleur 97*r* is positioned at one of the highest three sprockets R8 to R10. The second post downshift location LM is a normal position used in all other situations, i.e., when the combination of shift positions of the derailleurs 97*f* and 97*r* is such that the chain 95 does not readily touch against the chain guide CG of the front derailleur 97*f*. Thus, the second post downshift location LM is selected when the control unit 130 detects a positional relationship between the low-gear (shifted) sprocket F1 and the rear derailleur gear position that causes the bicycle chain 95 to be laterally angled less than a prescribed angle, e.g., when the rear derailleur 97r is positioned at one of the sprockets R1 to R7. FIG. 8 depicts a case in which the second shift position LP is located between the first post downshift location LT and the second post downshift location LM.

Similarly, when the low sprocket F1 is the first or initial sprocket, the front derailleur 97f moves from an initial sprocket engaged position (first shift position) LT or LM to a shifted sprocket engaged position (second shift position) HP in response to a manual operation of the manually operated shift device. The first shift position LM or LT corresponds to the first sprocket F1 to a second shift position HP while the shifted sprocket engaged position (second shift position) HP corresponds the second sprocket F2 during an upshift. Whether the initial sprocket engaged position (first shift position) is in the shift position LM or the shift position LT depends upon the angle of the chain 95 formed between the front sprocket F1 and the rear gears R1 to R10 relative to a plane that is perpendicular to the axes of rotation of the front sprockets F1 and F2 and the rear gears R1 to R10, as explained below. From the shifted sprocket engaged position (second shift position) HP, the chain guide CG moves a very small amount to a post shift position (third shift position) HM or HT. The shift position HP is a location where the chain 95 can be placed on the front sprocket F2, while the shift position HM and HT are locations where the chain 95 can be maintained on the front sprocket F2. Thus, the post shift position, during an upshift operation, includes a first post upshift location HT and a second post upshift location HM with the second post upshift location HM being farther from the sprocket F1 than the first post upshift location HT. The first post upshift location HT is a trimming shift position for preventing the chain 95 from contacting the chain guide CG (which is depicted as a rectangle in FIG. 5) of the front derailleur 97f when the combination of shift positions of the derailleurs 97f and 97r is such that the chain 95 assumes a crosswise orientation. More specifically, when the front derailleur 97f is positioned at the high-gear sprocket F2 and the rear derailleur 97r is positioned at one of the lowest three sprockets R1 to R3, the chain 95 assumes a crosswise orientation as indicated with the dotted lines in FIG. 5. Thus, the first post upshift location LT is selected when the control unit 130 detects a positional relationship between the high-gear (shifted) sprocket F2 and the rear derailleur gear position that causes the bicycle chain 95 to be laterally angled greater than a prescribed angle, e.g., when the rear derailleur 97r is positioned at one of the lowest three sprockets R1 to R3. The second post upshift location HM is a normal position used in all other situations, i.e., when the combination of shift positions of the derailleurs 97f and 97r is such that the chain 95 does not readily touch against the front derailleur 97f. Thus, the second post upshift location HM is selected when the control unit 130 detects a positional relationship between the high-gear (shifted) sprocket F2 and the rear derailleur gear position that causes the bicycle chain 95 to be laterally angled less than a prescribed angle, e.g., when the rear derailleur 97r is positioned at one of the sprockets R4 to R10. FIG. 8 depicts a case in which the second shift position HP is located between the first post upshift location HT and the second post upshift location HM.

Figure 7:
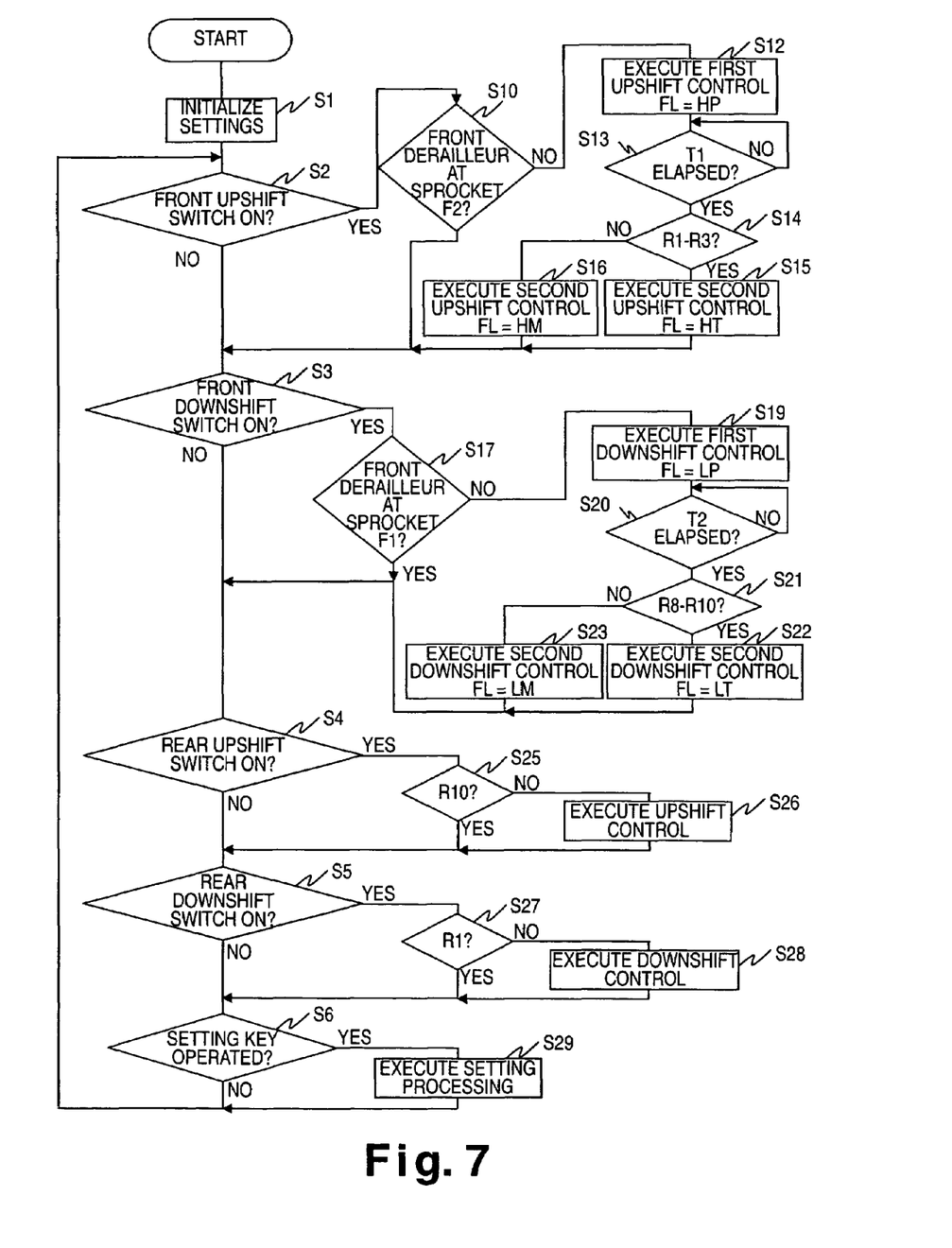
FIG. 7 is a control flowchart showing the processing executed by the gear shifting control apparatus in accordance with the present invention.

The operation of the apparatus will now be explained with reference to the control flowchart shown in FIG. 7. In the control flowchart, the processing steps are presented as consecutive steps, i.e., as though each step is completed fully before control proceeds to the next step. This presentation is adopted in order to simplify the explanation of the invention, but the control processing is actually executed in parallel at a high speed.

When the electric power supply to the gear shifting control unit 130 is turned on, the gear shifting control unit 130 initializes itself in step S1. The initialization involves resetting various flags and variables. In step S2, the control unit 130 determines if the front upshift switch 131f of the derailleur operating device 120f or 121f is on. In step S3, the control unit 130 determines if the front downshift switch 132f of the derailleur operating device 120f or 121f is on. In step S4, the control unit 130 determines if the rear upshift switch 131r of the derailleur operating device 120r or 121r is on. In step S5, the control unit 130 determines if the rear downshift switch 132r of the derailleur operating device 120r or 121r is on. In step S6, the control unit 130 determines if the setting key 136 has been operated.

If the control unit 130 determines that the front upshift switch 131f is on, then the control unit 130 proceeds from step S2 to step S10. In step S10, the control unit 130 determines if the current shift position FL of the front derailleur 97f is at the outer front sprocket F2, i.e., the higher-gear sprocket. More specifically, the control unit 130 determines if the current shift position FL is at the first post upshift location HT or the second post upshift location HM of the post shift position, as shown in FIG. 8. If the current shift position FL (i.e., the front derailleur 97f) is already at one of the third (post upshift locations) positions, then the control unit 130 proceeds to directly to step S3 because it is not possible to upshift any further. If the current shift position FL is not at the larger front sprocket F2, i.e., if the current shift position FL is at the smaller front sprocket F1, then the control unit 130 proceeds from step S10 to step S12. In step S12, the control unit 130 moves the current shift position FL of the front derailleur 97f to the second shift position HP by executing a first upshift control (the first gear shifting control) and proceeds to step S13 after the first upshift control is finished. In step S13, the control unit 130 determines if a time period T1 has elapsed in order to determine if it is time to execute a subsequent second upshift control (the second gear shifting control). The time period T1 is set to approximately 0.5 to 2 seconds, preferably to a value in the vicinity of 1 second. When the time period T1 elapses, the control unit 130 proceeds to step S14 and determines if the combination of the shift positions of the derailleurs 97f and 97r is such that the chain 95 will assume a crosswise orientation (greater or less than a prescribed angle defined by the positional relationship between the front sprocket F2 and the rear derailleur gear position). More specifically, the control unit 130 determines if the shift position of the rear derailleur 97r corresponds to one of the inner rear sprockets R1 to R3. If the result of step S14 is "YES," it is likely that the chain 95 will touch the front derailleur 97f and the control unit 130 proceeds to step S15 where it sets the current shift position FL equal to the first post upshift location HT. This setting operation constitutes the aforementioned second gear shifting control. As a result, the front derailleur 97f moves to the first post upshift location IT, which is located farther inward than the sprocket F2. Meanwhile, if the shift position of the rear derailleur 97r is anywhere else (at one of the sprockets R4 to R10), then the control unit 130 proceeds to step S16 and sets the current shift position FL equal to the normal third position, i.e., the second post upshift location HM. This setting operation constitutes the aforementioned second gear shifting control.

As a result, the front derailleur 97*f* moves from the second shift position HP to the second post upshift location HM.

If the control unit 130 determines that the front downshift switch 132*f* is on, then the control unit 130 proceeds from step S3 to step S17. In step S17, the control unit 130 determines if the current shift position FL of the front derailleur 97*f* is at the inner front sprocket F1, i.e., the lower-gear sprocket. More specifically, the control unit 130 determines if the current shift position FL is at the first post downshift location LT or the second post downshift location LM of the post shift position, as shown in FIG. 8. If the current shift position FL (i.e., the front derailleur 97*f*) is already at one of the third shift positions (post downshift locations), then the control unit 130 proceeds to directly to step S4 because it is not possible to downshift any further. If the shift position FL is not at the smaller front sprocket F1, i.e., if the current shift position FL is at the larger front sprocket F2, then the control unit 130 proceeds from step S17 to step S19. In step S19, the control unit 130 moves the shift position FL of the front derailleur 97*f* to the second shift position LP by executing a first downshift control (the first gear shifting control) and proceeds to step S20 after the first upshift control is finished. In step S20, the control unit 130 determines if a time period T2 has elapsed in order to determine if it is time to execute a subsequent second upshift control (the second gear shifting control). The time period T2 is set to approximately 0.5 to 2 seconds, preferably to a value in the vicinity of 1 second. When the time period T2 elapses, the control unit 130 proceeds to step S21 and determines if the combination of the shift positions of the derailleurs 97*f* and 97*r* is such that the chain 95 will assume a crosswise orientation (greater or less than a prescribed angle defined by the positional relationship between the front sprocket F1 and the rear derailleur gear position). More specifically, the control unit 130 determines if the shift position of the rear derailleur 97*r* corresponds to one of the outer rear sprockets R8 to R10. If the result of step S21 is "YES," it is likely that the chain 95 will touch the front derailleur 97*f* and the control unit 130 proceeds to step S22 where it sets the current shift position FL equal to the first post downshift location LT. This setting operation constitutes the aforementioned second gear shifting control. As a result, the front derailleur 97*f* moves to the first post downshift location LT, which is located farther outward than the sprocket F1. Meanwhile, if the shift position of the rear derailleur 97*r* is anywhere else (at one of the sprockets R1 to R7), then the control unit 130 proceeds to step S23 and sets the current shift position FL equal to the normal third position, i.e., the second post downshift location LM. This setting operation constitutes the aforementioned second gear shifting control. As a result, the front derailleur 97*f* moves from the second shift position LP to the second post downshift location LM.

If the control unit 130 determines that the rear upshift switch 131*r* is on, then the control unit 130 proceeds from step S4 to step S25. In step S25, the control unit 130 determines if the shift position of the rear derailleur 97*r* is at the outermost rear sprocket R10, i.e., the highest-gear or top sprocket. If the shift position of the rear derailleur 97*r* is already at the top sprocket R10, then the control unit 130 proceeds to directly to step S5 because it is not possible to upshift any further. If the shift position of the rear derailleur 97*r* is not at the top (outermost) sprocket R10, i.e., if the shift position is at one of the other sprockets R1 to R9, then the control unit 130 proceeds from step S25 to step S26. In step S26, the control unit 130 executes an upshift control whereby the rear derailleur 97*r* is moved to a shift position corresponding to one of the sprockets R2 to R10 and proceeds to step S5.

If the control unit 130 determines that the rear downshift switch 132*r* is on, then the control unit 130 proceeds from step S5 to step S27. In step S27, the control unit 130 determines if the shift position of the rear derailleur 97*r* is at the innermost rear sprocket R1, i.e., the lowest-gear sprocket. If the shift position of the rear derailleur 97*r* is already at the sprocket R10, then the control unit 130 proceeds to directly to step S6 because it is not possible to downshift any further. If the shift position of the rear derailleur 97*r* is not at the innermost sprocket R1, i.e., if the shift position is at one of the other sprockets R2 to R10, then the control unit 130 proceeds from step S27 to step S28. In step S28, the control unit 130 executes a downshift control whereby the rear derailleur 97*r* is moved to a shift position corresponding to one of the sprockets R1 to R9 and proceeds to step S6.

If the control unit 130 determines that the setting key 136 has been operated, then the control unit 130 executes setting processing whereby it changes the setting value in accordance with the key operation. The setting processing enables the locations of each of the shift positions HT, HM, HP, LT, LM, and LP to be changed relative to the sprockets F1 and F2.

Since the movement of the front derailleur 97*f* is divided into a first gear shifting operation (i.e., the first upshift control or first downshift control) in which the front derailleur is moved from a first shift position to a second shift position and a second gear shifting operation (i.e., the second upshift control or second downshift control) in which the front derailleur is moved a very small amount from the second shift position to a post shift position, the chain 95 can be prevented from touching the front derailleur 97*f* by setting the direction in which and the amount by which the front derailleur 97*f* is moved in the second gear shifting operation appropriately in accordance with shift position of the rear derailleur 97*r*. Also, since the second gear shifting operation is executed after the first gear shifting operation has been completed, the front derailleur 97*f* stops temporarily at an intermediate point during the process of shifting the chain 95 from one sprocket to the other. As a result, it is more difficult (less likely) for the chain to fall off.

Although the previous embodiment presents an example in which the front sprocket cluster has two sprockets, it is also acceptable to execute similar processing in a case where the front sprocket cluster has three sprockets. In a case where the front sprocket cluster has three sprockets F1 to F3, it is acceptable to skip the control processing in which the shift position of the rear derailleur 97*r* is determined (steps S14 and S21) and proceed directly to steps S16 and S23 when the front derailleur 97*f* is positioned at the middle sprocket F2.

Although the previous embodiment presents an example in which the gear shifting control apparatus is applied to a road bike, the invention can be applied to any type of bicycle that has an externally mounted gear shifting device.

Although the previous embodiment presents an example in which the front derailleur is electrically powered, the present invention can also be applied to a mechanically operated front derailleur that is driven using a cable instead of electric power. In the case of a mechanically operated front derailleur, the movement of the front derailleur can be stopped temporarily at the second shift position by a mechanical locking device and afterwards the locked state can be released by an engaging protrusion or the like provided on the crank.

Figure 9:
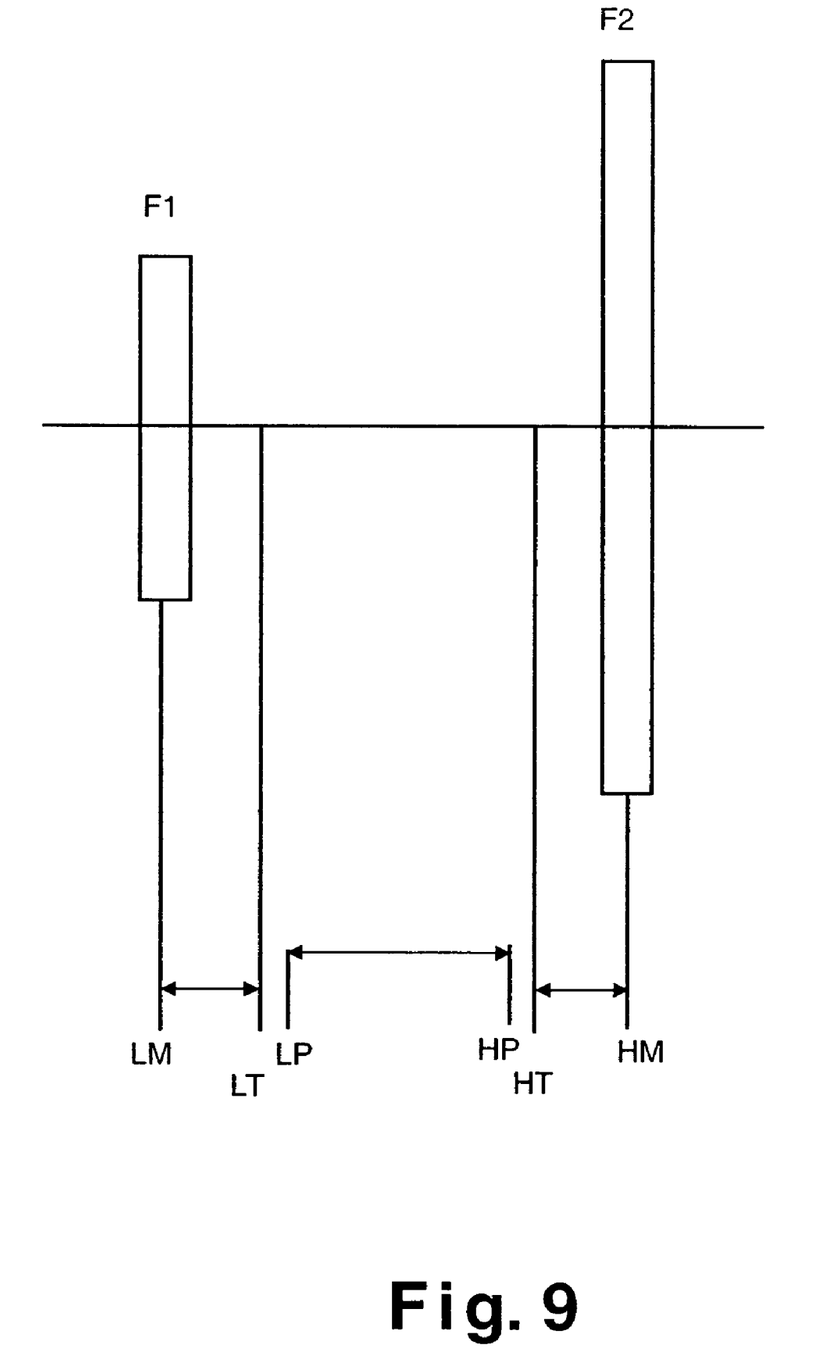
FIG. 9 is a simplified schematic view of a second front sprocket cluster that shows the positional relationships of the shift positions in accordance with another application of the present invention.

Although the previous embodiment presents an example in which the second shift position HP (or LP) is located between the first post downshift location LT (or HT) and the second post downshift location LM (or HM), it is also acceptable for the second shift position HP (or LP) to be located between the first shift position LP (or HP) and the first post downshift location LT (or HT) as shown in FIG. 9. With such a shift position arrangement, the first shift operation can be completed with a smaller amount of movement.

Although the previously described embodiment does not execute the trim adjustment when the rear derailleur is shifted, it is also acceptable to configure the apparatus such that, for example, the front derailleur 97f is moved from the second post shift position (normal position) to the first post shift position (trim position) LT or HT when necessary after the rear derailleur is shifted. More specifically, it is acceptable to configure the apparatus such that the front derailleur 97f is shifted from the second post downshift location LM to the first post downshift location LT (trim position) when the rider upshifts the rear derailleur 97r from the sprocket R7 to the sprocket R8 while the front derailleur is positioned at the sprocket F1 and such that the front derailleur 97f is shifted from the second post upshift location HM to the first post upshift location HT (trim position) when the rider downshifts the rear derailleur 97r from the sprocket R4 to the sprocket R3 while the front derailleur is positioned at the sprocket F2.

As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle gear shifting control apparatus comprising:
   a front derailleur including a movable chain guide configured to move a bicycle chain;
   a manually operated shift device configured and arranged to operate the front derailleur to shift gears between at least a first sprocket and a second sprocket with the first and second sprockets being selectively an initial sprocket and a shifted sprocket depending on a shift direction;
   a first gear shifting component configured to perform a first gear shifting operation to move the chain guide from an initial sprocket engaged position to a shifted sprocket engaged position in response to a manual operation of the manually operated shift device such that the bicycle chain is shifted from the initial sprocket to the shifted sprocket; and
   a second gear shifting component configured to perform a second subsequent gear shifting operation to move the chain guide an additional amount from the shifted sprocket engaged position to a post shift position that maintains the bicycle chain on the shifted sprocket after pausing at the shifted sprocket engaged position.

2. The bicycle gear shifting control apparatus as recited in claim 1, wherein
   the second gear shifting component is further configured to change a location of the post shift position in accordance with a detected rear derailleur gear position.

3. The bicycle gear shifting control apparatus as recited in claim 2, wherein
   the second gear shifting component is further configured to selectively move the chain guide to one of a first post shift location and a second post shift location as the post shift position with the second post shift location being the located farther away from the initial sprocket than the first post shift location.

4. The bicycle gear shifting control apparatus as recited in claim 3, wherein
   the shifted sprocket engaged position is located between the first post shift location and the second post shift location.

5. The bicycle gear shifting control apparatus as recited in claim 3, wherein
   the shifted sprocket engaged position is located between the initial sprocket engaged position and the first post shift location.

6. The bicycle gear shifting control apparatus as recited in claim 3, wherein
   the second gear shifting component is further configured to move the chain guide from the shifted sprocket engaged position to the first post shift location upon detecting a positional relationship between the shifted sprocket and the rear derailleur gear position that causes the bicycle chain to be laterally angled greater than a prescribed angle; and
   the second gear shifting component is further configured to move the chain guide from the shifted sprocket engaged position to the second post shift position upon detecting the positional relationship between the shifted sprocket and the rear derailleur gear position that causes the bicycle chain to be laterally angled less than the prescribed angle.

7. The bicycle gear shifting control apparatus as recited in claim 3, further comprising
a shift continuation determining component configured to detect if the first gear shifting operation has been completed when a prescribed amount of time has elapsed.

8. The bicycle gear shifting control apparatus as recited in claim 3, further comprising
a shift continuation determining component configured to detect if the first gear shifting operation has been completed based a rotational position of a bicycle crank reaching a prescribed rotational position.

9. The bicycle gear shifting control apparatus as recited in claim 3, further comprising
a shift position setting component configured and arranged to selectively change the initial sprocket engaged position, the shifted sprocket engaged position and the post shift position relative to the initial sprocket and the shifted sprocket.

10. The bicycle gear shifting control apparatus as recited in claim 3, wherein
the front derailleur is electromechanically controlled by a control unit that operates a drive unit.

11. The bicycle gear shifting control apparatus as recited in claim 2, further comprising
a shift continuation determining component configured to detect if the first gear shifting operation has been completed when a prescribed amount of time has elapsed.

12. The bicycle gear shifting control apparatus as recited in claim 2, further comprising
a shift continuation determining component configured to detect if the first gear shifting operation has been completed based a rotational position of a bicycle crank reaching a prescribed rotational position.

13. The bicycle gear shifting control apparatus as recited in claim 2, further comprising
a shift position setting component configured and arranged to selectively change the initial sprocket engaged position, the shifted sprocket engaged position and the post shift position relative to the initial sprocket and the shifted sprocket.

14. The bicycle gear shifting control apparatus as recited in claim 2, wherein
the front derailleur is electromechanically controlled by a control unit that operates a drive unit.

15. The bicycle gear shifting control apparatus as recited in claim 1, further comprising
a shift continuation determining component configured to detect if the first gear shifting operation has been completed when a prescribed amount of time has elapsed.

16. The bicycle gear shifting control apparatus as recited in claim 1, further comprising
a shift continuation determining component configured to detect if the first gear shifting operation has been completed based a rotational position of a bicycle crank reaching a prescribed rotational position.

17. The bicycle gear shifting control apparatus as recited in claim 1, further comprising
a shift position setting component configured and arranged to selectively change the initial sprocket engaged position, the shifted sprocket engaged position and the post shift position relative to the initial sprocket and the shifted sprocket.

18. The bicycle gear shifting control apparatus as recited in claim 1, wherein
the front derailleur is electromechanically controlled by a control unit that operates a drive unit.

* * * * *